US012778175B2

(12) United States Patent
Konidari et al.

(10) Patent No.: US 12,778,175 B2
(45) Date of Patent: Nov. 3, 2026

(54) MACHINE FOR OPENING AND CRACKING SHELLED NUTS

(71) Applicants: Panagiota Konidari, Piraeus (GR); Isidoros Konidaris, Piraeus (GR)

(72) Inventors: Panagiota Konidari, Piraeus (GR); Isidoros Konidaris, Piraeus (GR)

(73) Assignees: Panagiota Konidari, Piraeus (GR); Isidoros Konidaris, Piraeus (GR)

( * ) Notice: Subject to any disclaimer, the term of this patent is extended or adjusted under 35 U.S.C. 154(b) by 725 days.

(21) Appl. No.: 18/328,004

(22) Filed: Jun. 2, 2023

(65) Prior Publication Data

US 2023/0309599 A1 Oct. 5, 2023

Related U.S. Application Data

(63) Continuation of application No. PCT/GR2021/000074, filed on Nov. 25, 2021.

(30) Foreign Application Priority Data

Dec. 2, 2020 (GR) .............................. 20200100709

(51) Int. Cl.
*A23N 5/08* (2006.01)

(52) U.S. Cl.
CPC .................................... *A23N 5/08* (2013.01)

(58) Field of Classification Search
CPC .................................... A23N 5/08; A23N 5/00
USPC ............................................................ 99/568
See application file for complete search history.

(56) References Cited

U.S. PATENT DOCUMENTS 1,921,238 A 8/1933 Milam
2,622,642 A * 12/1952 Meyer ...................... A23N 5/00 99/582
4,201,126 A 5/1980 Evans
4,418,617 A 12/1983 Quantz
(Continued)

FOREIGN PATENT DOCUMENTS

CN 106108041 A 11/2016

OTHER PUBLICATIONS

European Patent Office, International Search Report in International Patent Application No. PCT/GR2021/000074, 4 pp. (Mar. 14, 2022).
(Continued)

*Primary Examiner* — Elizabeth M Kerr
*Assistant Examiner* — Simpson A Chen
(74) *Attorney, Agent, or Firm* — Leidig, Voit & Mayer, Ltd.

(57) ABSTRACT

A machine for cracking and opening pistachio shells per unit, which applies pressure to both ends of the pistachio at the same time with an adjustable depth of pressure, includes is equipped with a chain having perforated pins to which pistachio receptacles are attached. The receptacles are pistachio-sized and receive the pistachios one by one. The machine is equipped with a head with a gear, which drives the chain and passes through the feeder, picks up the pistachios one by one and transports them to the head. When the receptacles reach the head the adaptors hold the pistachio on the receptacles and when the receptacles reach the top of the head, they are pressed by the pressure bearing and press the nuts onto the stranded adaptor and cause them to break or open.

8 Claims, 10 Drawing Sheets

(56) References Cited

U.S. PATENT DOCUMENTS

| | | | | |
|---|---|---|---|---|
| 4,773,323 | A | 9/1988 | Frasch et al. | |
| 5,325,769 | A * | 7/1994 | Filice | A23N 5/00 99/581 |
| 5,551,470 | A | 9/1996 | Duvall | |
| 6,772,680 | B1 | 8/2004 | Quantz et al. | |
| 7,673,561 | B1 * | 3/2010 | Savage | A23N 5/00 99/581 |

OTHER PUBLICATIONS

European Patent Office, Written Opinion in International Patent Application No. PCT/GR2021/000074, 5 pp. (Mar. 14, 2022).

* cited by examiner

MACHINE FOR OPENING AND CRACKING SHELLED NUTS

CROSS-REFERENCE TO RELATED APPLICATIONS

The instant patent application claims priority to International Patent Application No. PCT/GR2021/000074, filed on Nov. 25, 2021, and to Greek Patent Application No. 20200100709, filed on Dec. 2, 2020, each of which is incorporated herein in its entirety by reference.

FIELD OF THE DISCLOSURE

The present disclosure generally relates to the field of mechanical engineering and in particular to the field of machinery for breaking and opening nut shells.

BACKGROUND OF THE INVENTION

Shelled pistachios are marketed either fully shelled in the form of kernels or with the shell partially opened. In the annual production of pistachios, a proportion of this production ranges from about 10% to 80%, depending on the weather conditions, is made up of pistachios which have not opened naturally but have remained completely closed. In any case, there is therefore a need for this large proportion of pistachios that are completely closed and have not opened naturally to be either peeled completely by artificial means or to have a small opening in the shell made by artificial means so that the consumer can open them, which should be as elegant as possible, without distorting the shell and as uniform as possible.

The problem is therefore that the pistachios that have not opened naturally and have remained closed are hulled or partially opened by artificial means. The most common way of solving the problem is to crack or open the pistachios one by one with human hands, in particular with hand tools (small pliers).

As regards solving the problem with machinery, the problem is exacerbated by the fact that each pistachio is different in length and thickness. For this reason, when processing the pistachio to crack the shell, with the intention either to remove the shell completely or to make only a small opening in the shell, the machinery of the present technique is used, to a large extent, fail to adjust the pressure applied to the pistachio shell correctly, with the result that they often fail to open the shell partially and either crush or deform the pistachio. In any case, the loss of product is high and unprofitable, due to the high price of the product. In order to break the shell of the pistachio without crushing the kernel, the correct way is to apply the opening pressure to each pistachio individually and to apply the pressure simultaneously to both ends of each pistachio to a certain depth and not to the sides.

A solution to the problem is proposed by U.S. Pat. No. 5,551,470, which is however technically complex and does not crack the pistachios individually (one by one).

Also another solution to the problem is proposed by U.S. Pat. Nos. 4,418,617 and 6,772,680 B1, which attempt to crack the shell of each pistachio individually, however they use a hydraulic system and are therefore complex to manufacture, difficult to maintain and slow to produce a hulled product.

Another solution is proposed in U.S. Pat. No. 5,325,769, which attempts to crack the shells individually, but of the walnuts rather than the pistachios. The difference in the shape of the nuts, that walnuts have a round shape while pistachios have a long shape, also brings technical differences to the invention. In order to crack the shell of the walnuts, pressure can be applied at any point of the shell, so it is not technically important how each nut is placed in the cracking position. It is therefore a different problem to be solved.

There are also other unpatented inventions which have tried to solve the same technical problem, but which have the disadvantage that the adjustment of the depth of pressing of the pistachios is carried out by means of a cumbersome mechanism with ambiguous adjustment, and that the adjustment mechanism cannot be used during operation of the machine, but an interruption of production is required in order to adjust the machinery, as many times as necessary until the desired result is achieved.

BRIEF SUMMARY OF THE INVENTION

None of the above solutions suggests breaking each pistachio individually by applying pressure at specific points, the two ends of the pistachio. The machine in accordance with the present disclosure solves the above technical problems.

In one embodiment, the machine includes a movable feed chain with a perforated pin carries in its holes adapted small pistachio receptacles (scoops). As the chain passes through the feed bin, it picks up one pistachio at a time, per unit at a time, on each small receptacle (scoop). The receptacles are oblong in shape and of a size similar to that of a pistachio, so that each receptacle, passing through the feed bin, receives only one pistachio placed only along the length of the receptacle, this being the desired position in order to apply pressure simultaneously to the two ends and not to the sides of each individual pistachio. The receptacles, which are mounted on the moving chain, then use the chain to guide each pistachio to the cracking head, which applies pressure to the two ends, not the sides, of each individual pistachio. The machine is capable of adjusting the depth of pressure applied to the shell of each pistachio so as to achieve complete cracking of the shell and peeling of the pistachio, or to achieve only opening of the shell. The adjustment is made during the operation of the machine without interrupting production.

BRIEF DESCRIPTION OF THE SEVERAL VIEWS OF THE DRAWING(S)

Figure 3B:
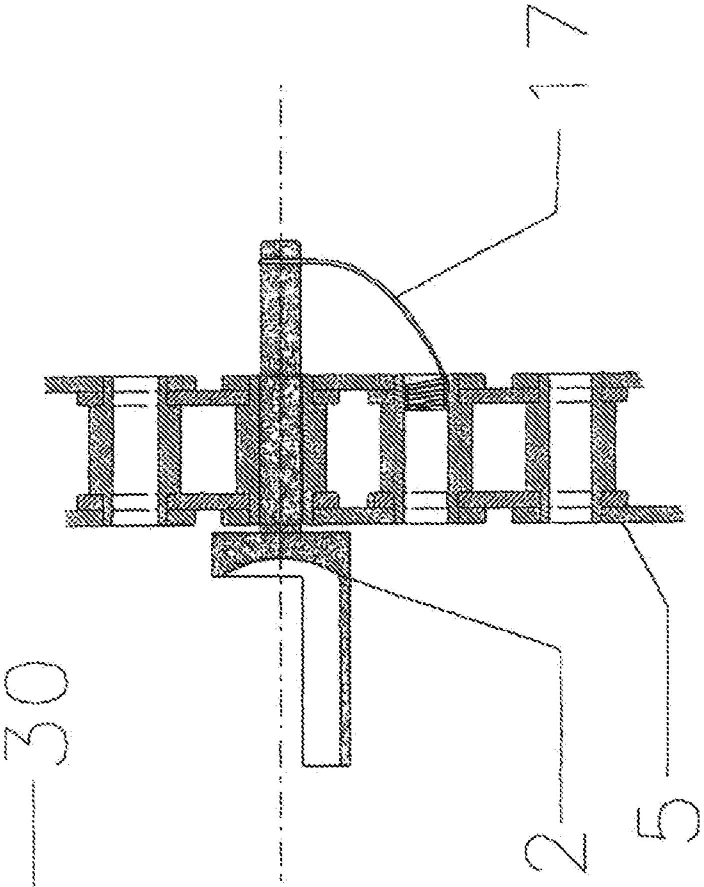
Figure 3A:
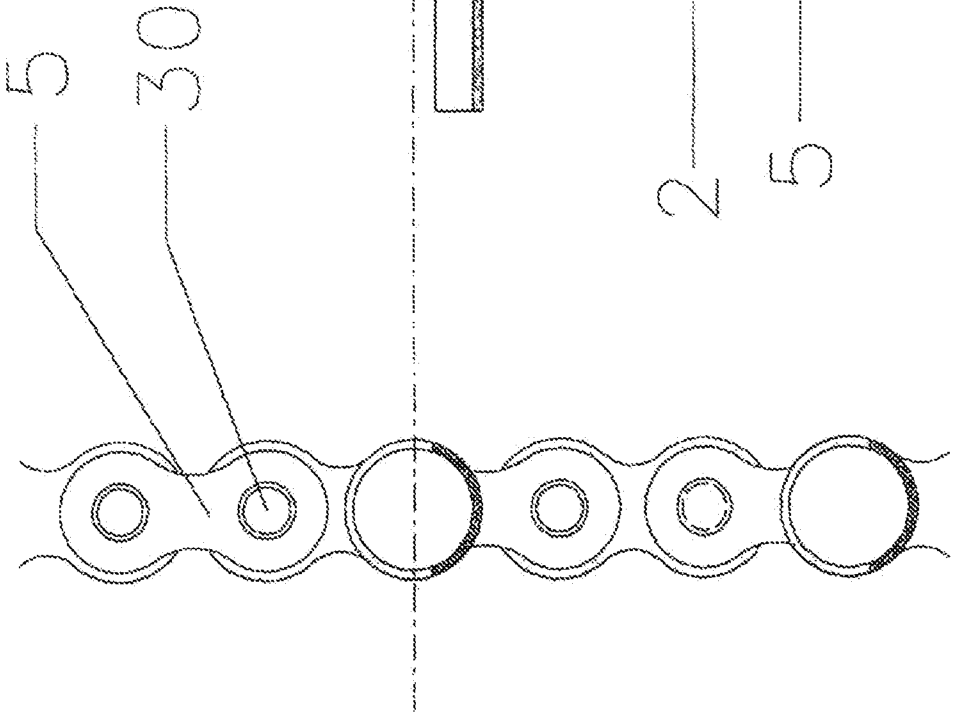

FIGS. 3*a* and 3*b* illustrate a side view of a portion of a chain (FIG. 3*a*) and also a cross section view of the chain with a pistachio receptacle mounted thereon (FIG. 3*b*).

Figure 4:
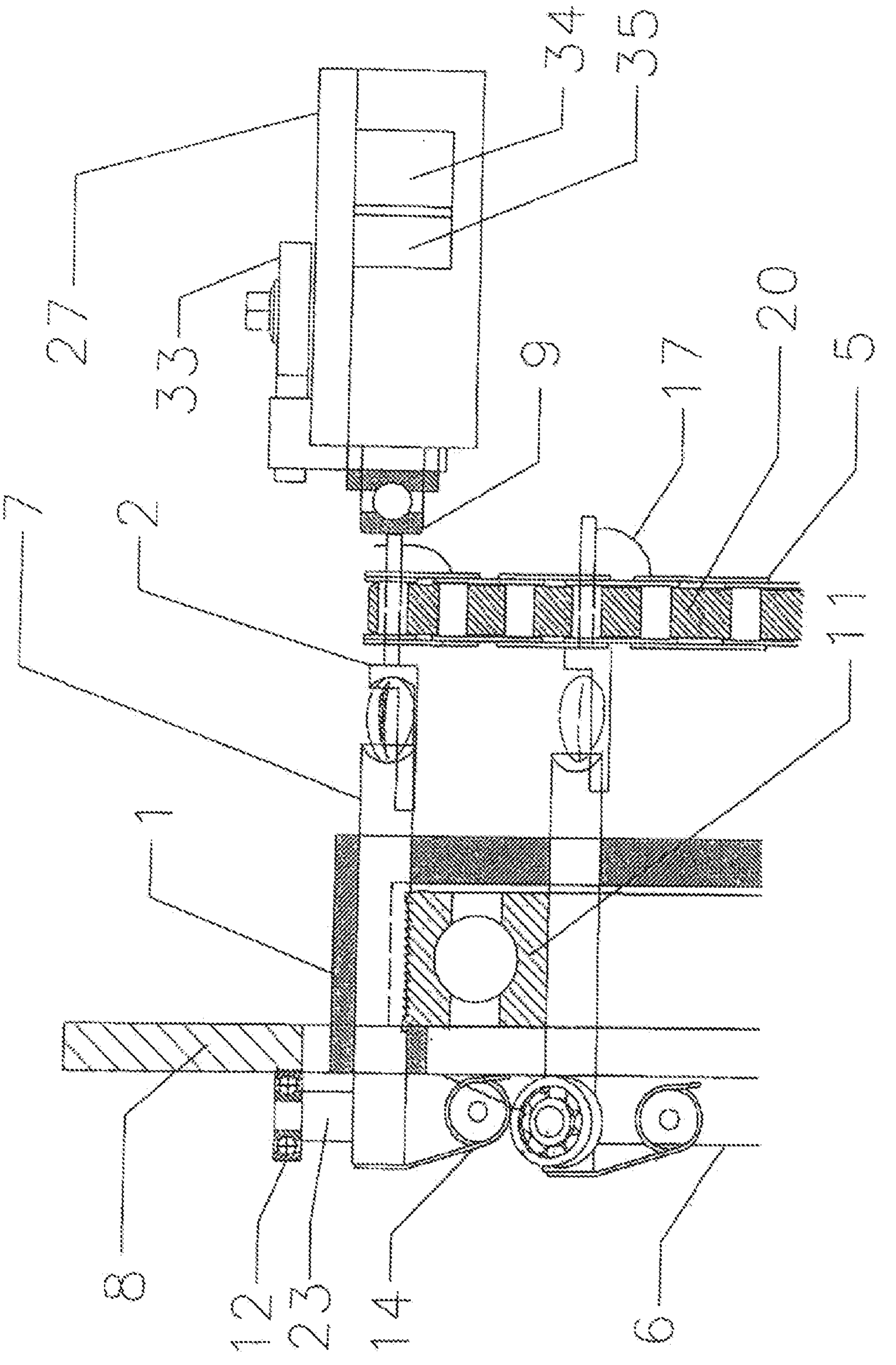

FIG. 4 is an enlarged detail view in cross section of a crusher head in accordance with the disclosure.

Figure 5:
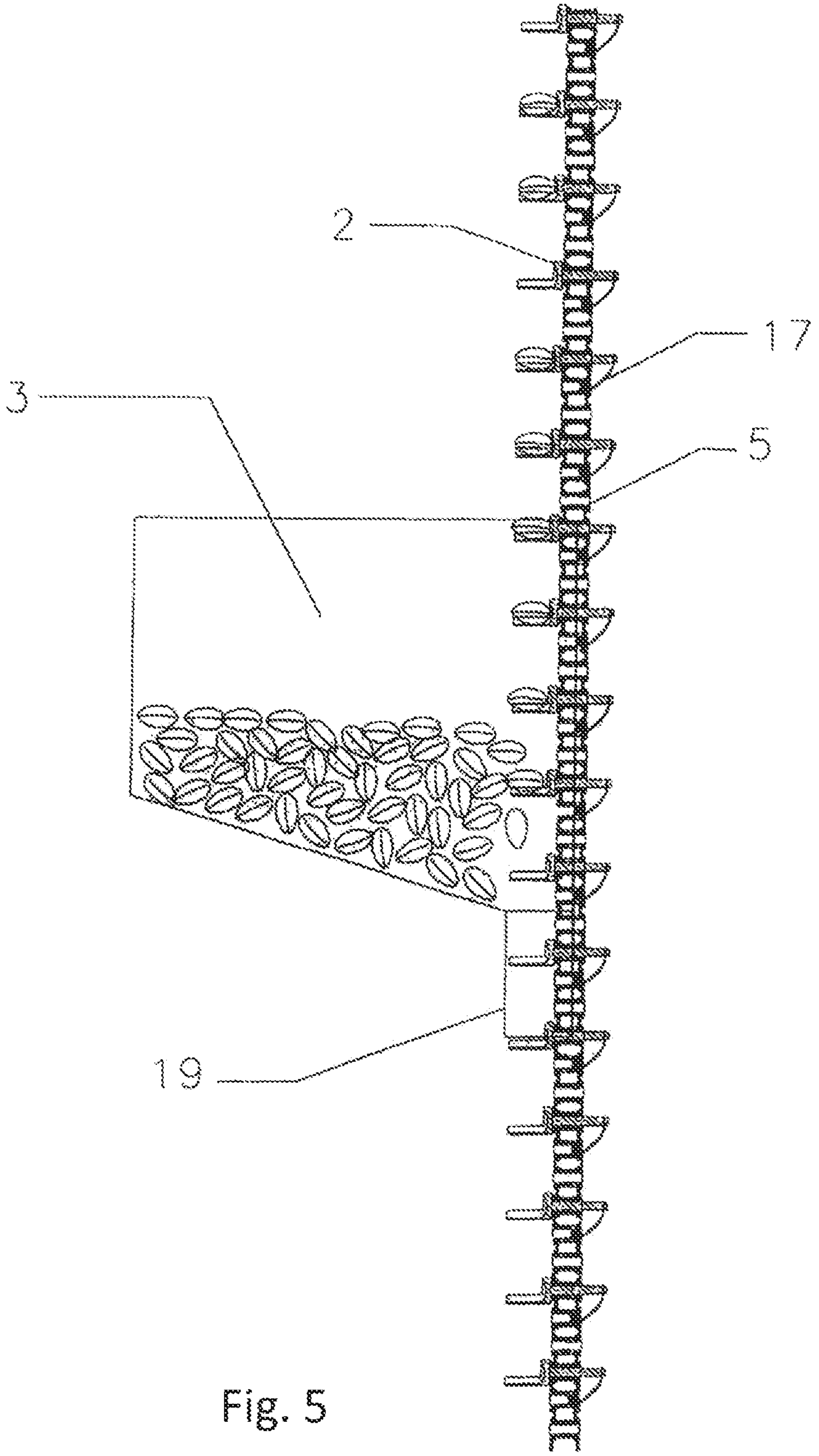

FIG. 5 is an enlarged detail view of the chain interacting with a bin containing pistachios in accordance with the disclosure.

Figure 6:
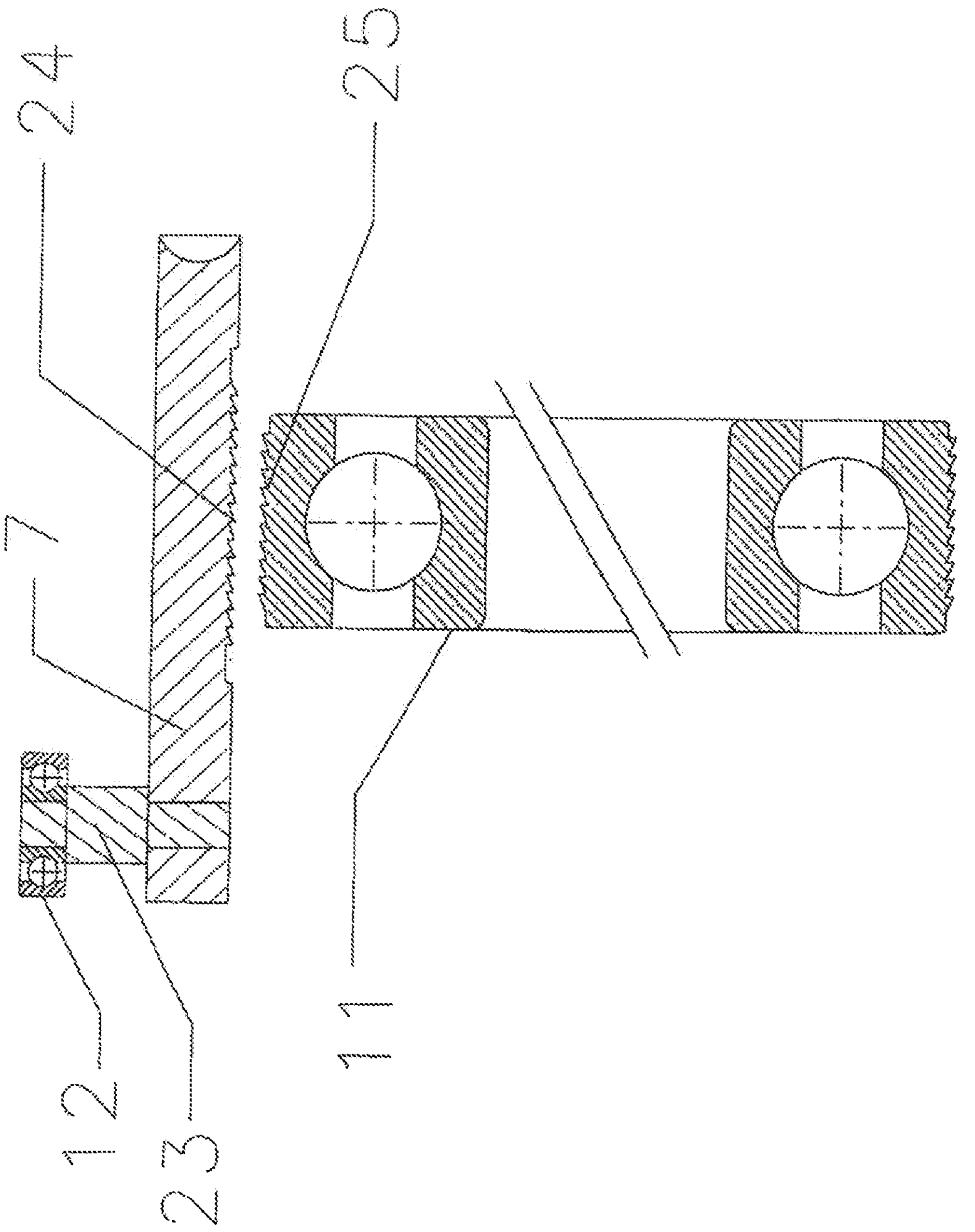

FIG. 6 is an enlarged detail view of a length adaptor in accordance with the disclosure.

Figure 7B:
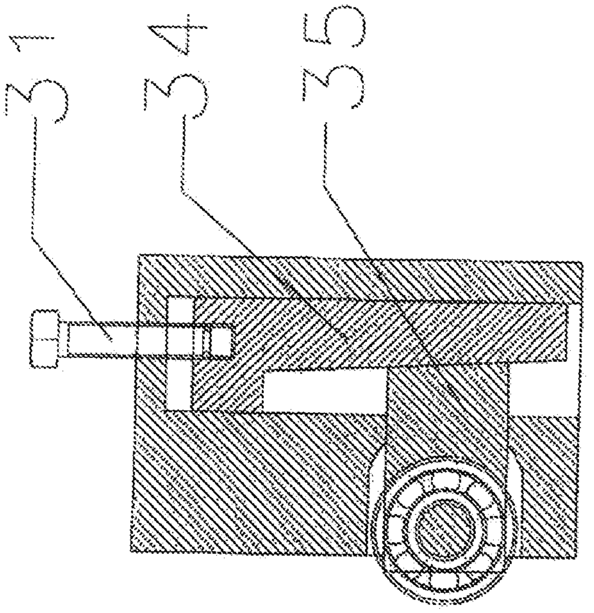
Figure 7A:
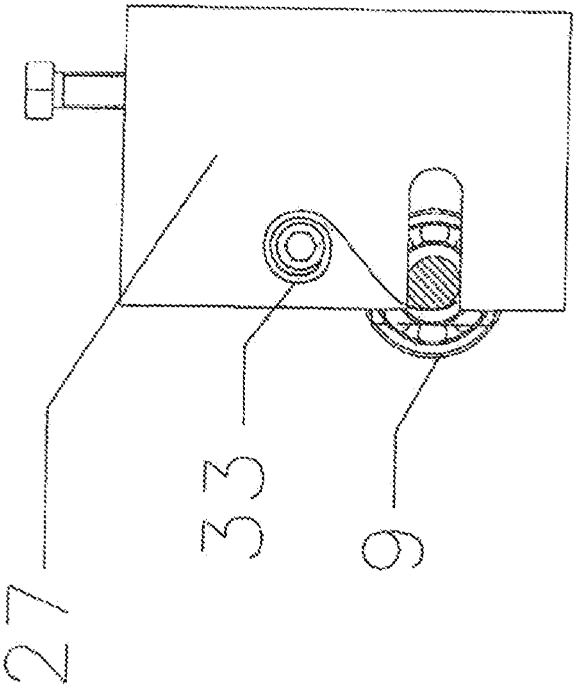

FIG. 7*a* is a plan view, and FIG. 7*b* is a cross section view of a pistachio pressure depth adjustment mechanism in accordance with the disclosure.

Figure 8A:
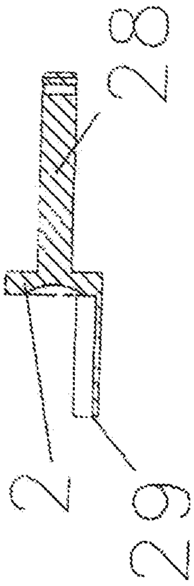
Figure 8B:
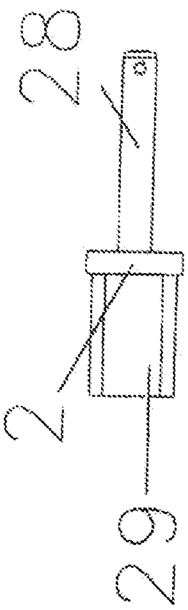
Figure 8C:
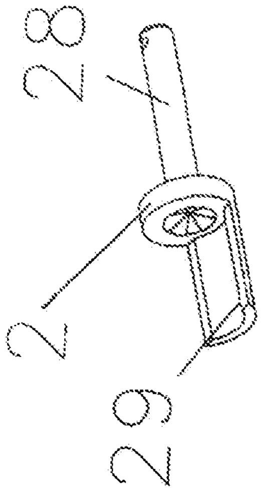

FIGS. 8*a*, 8*b*, and 8*c* are different views of a pistachio receptacle in accordance with the disclosure.

Figure 9A:
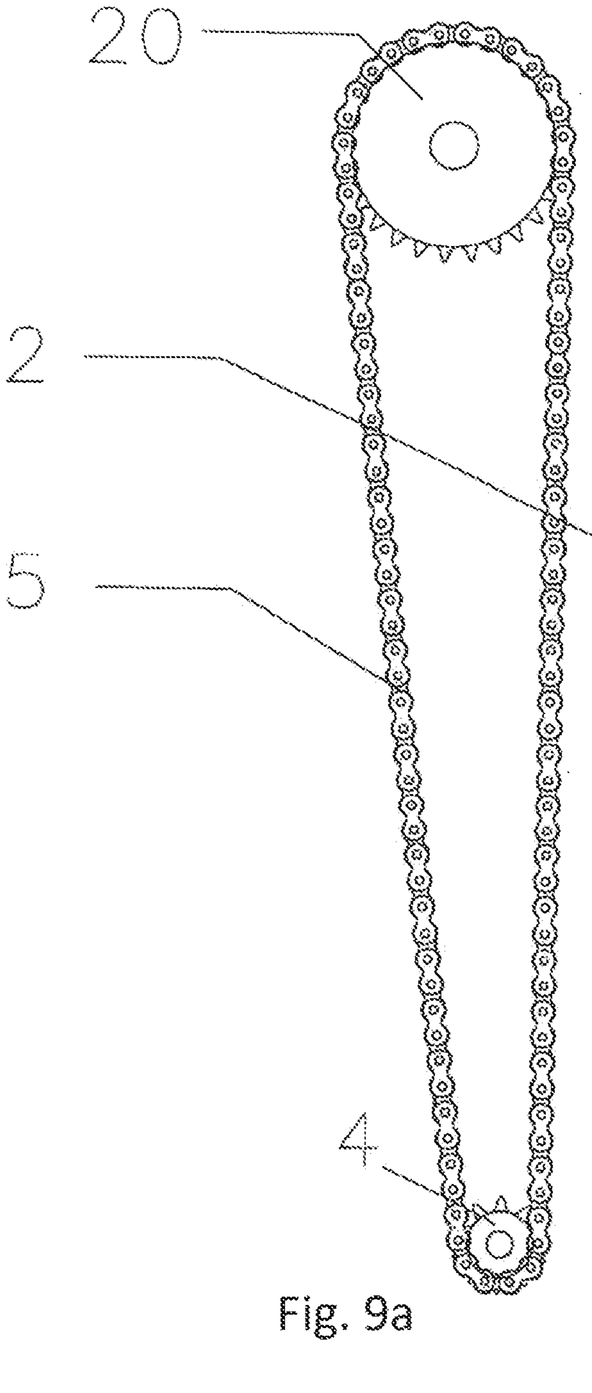

FIG. 9*a* is a side view of a feed chain with the tensioner gear and head gear in accordance with the disclosure.

Figure 9B:
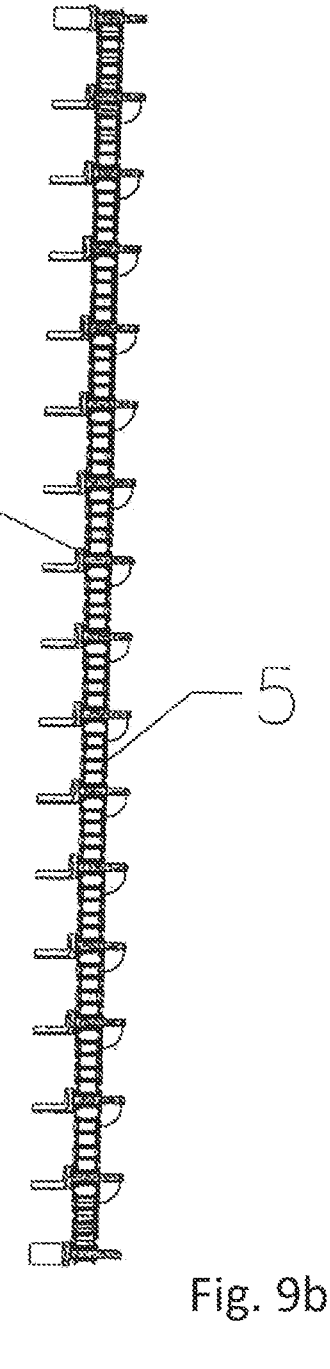

FIG. 9*b* is a sectional view of the feed chain with a perforated pin with the pistachio receptacles mounted thereon, per third hole, in accordance with the disclosure.

Figure 10B:
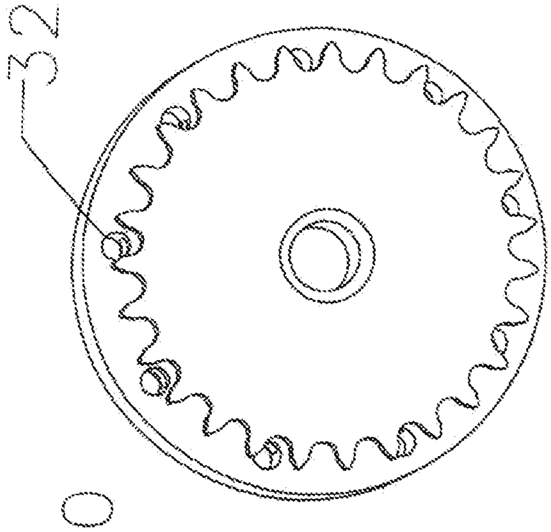
Figure 10A:
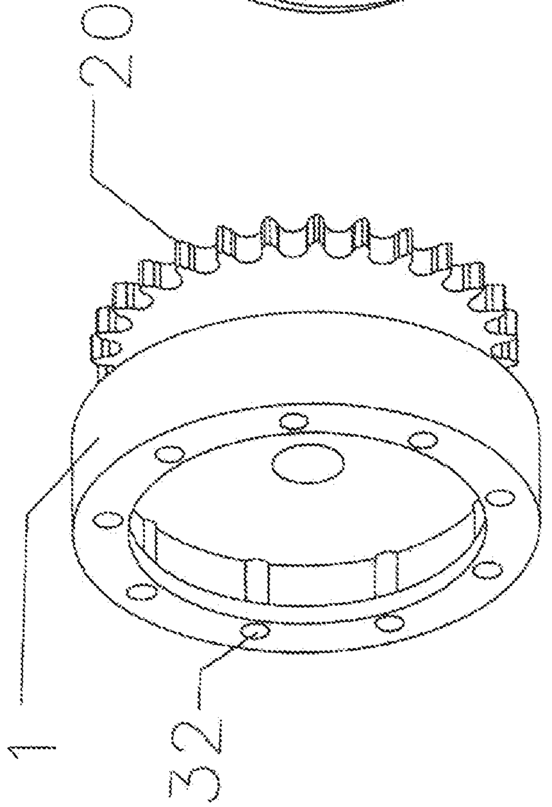

FIGS. 10*a* and 10*b* are outline views of the crusher head with the gear, from the cam and adaptor immobilizing bearing mounting side and from the gear side, in accordance with the disclosure.

DETAILED DESCRIPTION OF THE INVENTION

Figure 1:
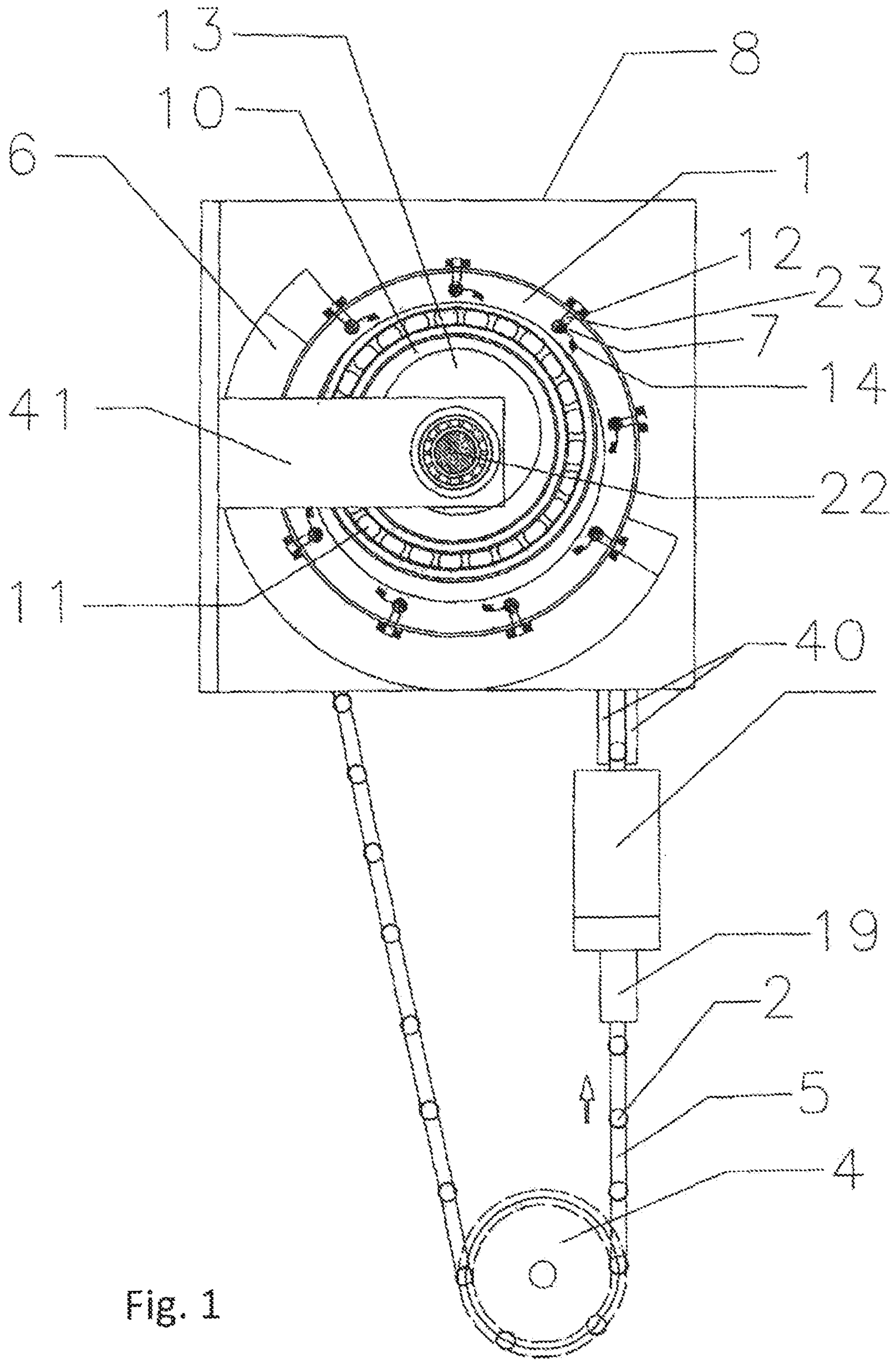
FIG. 1 is a side view of a machine in accordance with the disclosure.

FIG. 1 illustrates a side view of the machine that includes the crusher, with pistachio feed bin, crusher head feed chain with perforated pin and pistachio receivers mounted thereon, tensioner gear, crusher head, with the length adaptors mounted thereon, the adapter compression springs, the adapter stop bearing, the adaptor stop bearing positioning cams, and the adaptor release cam.

Figure 2:
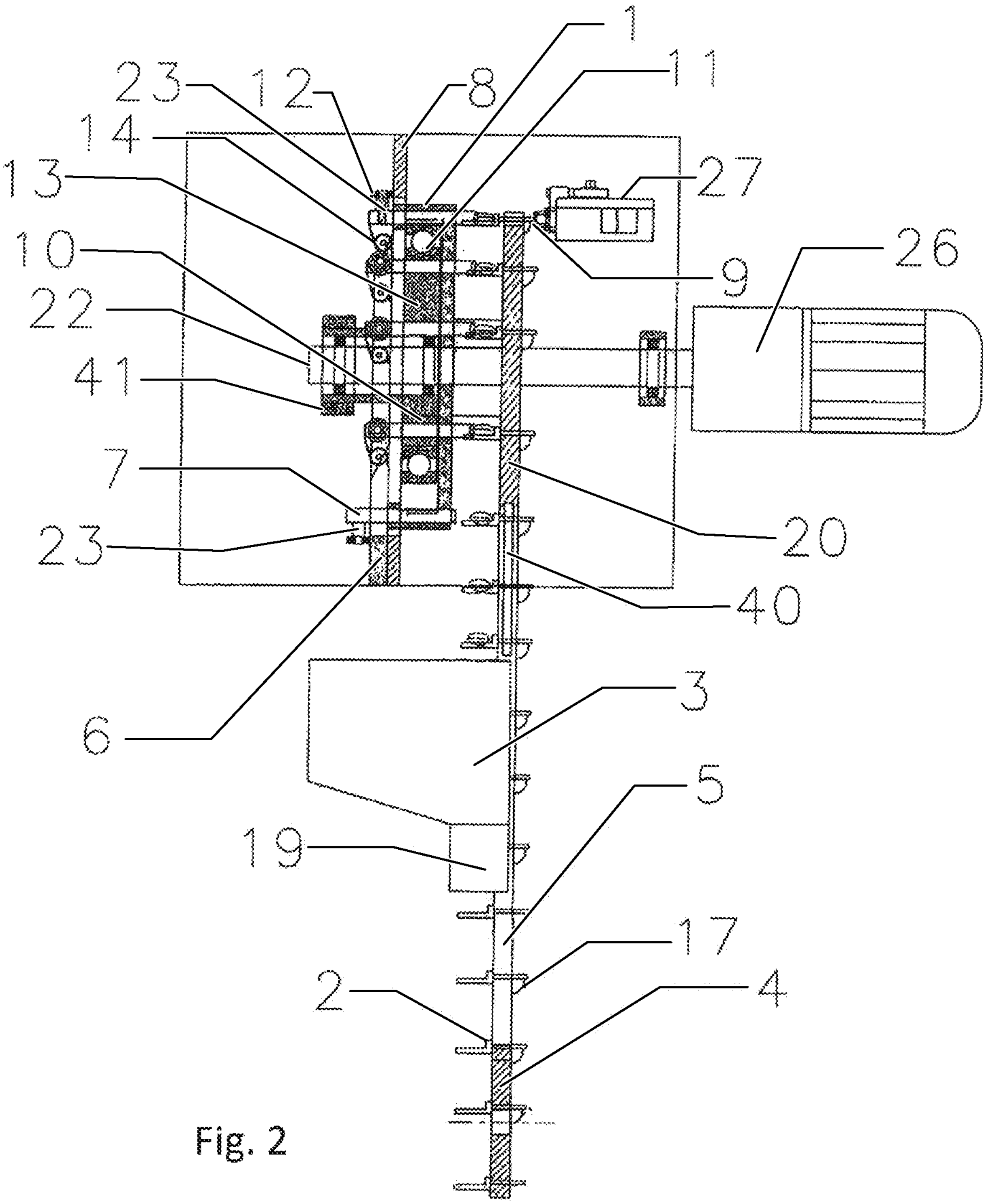
FIG. 2 is a cross section view of the machine of FIG. 1.

FIG. 2 illustrates a cross-sectional view of the crusher as shown in Drawing 1, from the feed bin side, with the head gear, the length adaptors, the adaptor compression springs, and the pistachio pressing depth adjustment mechanism.

FIGS. 3*a* and 3*b* are side views of the chain with the receptacles per third hole and a cross-sectional detail of the chain with pistachio receptacle on the perforated pin and return spring.

FIG. 4 illustrates a cross-sectional detail of the crusher head at the top of the crusher head where the pistachios are pressed.

FIG. 5 illustrates in detail a cross-sectional view of the chain with a perforated pin carrying, in three-hole increments, pistachio receptacles, and a cross-sectional view of the pistachio feed bin.

FIG. 6 illustrates in detail a sectional view of the length adaptor and its immobilizing bearing.

An exemplary embodiment is described in detail below, with reference to the attached figures. As shown in the figures, a system comprises a feed bin (3), a round, rotating crusher head (1), a lower tensioner gear (4), an upper head gear (20) and a chain (5) with a perforated pin, with pistachio receptacles (2) mounted thereon, which chain (5) feeds the crusher head (1). The bin (3) is positioned at a height approximately halfway between the crusher head (1) and the tensioner/gear (4).

The perforated pin chain (5) for feeding pistachios (FIGS. 1, 5, and 9) is stretched and moved around the gear/stretcher (4) which is located at the bottom of the machine and by the gear (20) of the crusher head (1) which is located at the top of the machine screwed concentrically onto the round crusher head (1). The head gear (20) rotates together with the head (1) around the drive shaft (22) and is fitted onto the head (1) so that every third gap between the teeth of the gear (20) is located directly opposite a hole (32) in the head (1) (FIG. 10*b*).

The chain (5) with perforated pins (30), with pistachio receptacles (2) in its holes, moves upwards in the direction from the lower gear (4) to the upper gear (20) and passes through the feed bin (3) (FIGS. 1, 2, 5 and 9*a*). The part of the chain (5) between the lower gear (4) and the upper gear (20) is always in a vertical position. The chain (5) moves between two guides (40) which prevent the chain from oscillating and the pistachios being transported from falling. Pistachio receptacles (2) are fitted to the perforated pins/holes (30) of the chain (5), one per third hole (30) (FIG. 3*a*, FIGS. 5 and 9*b*).

The chain (5) is mounted on the gear (20) of the head (1) in such a way that as the head (1) rotates with the gear (20) and the chain (5) moves, the chain (5) carries pistachio receptacles (2) per three perforated pins (30), when the pins (30) having receptacles (2) reach the head (1) they are located in those gaps between the teeth of the gear (20) which three by three are directly opposite the holes (32) of the head (1) (FIG. 10*b*) and into which holes (32) the adaptors (7) are fitted (FIGS. 2, 4).

As shown in FIGS. 8*a*, 8*b*, 8*c*, the pistachio receptacles (2) have an elongated hollow cantilever (scoop) (29) and a support pin (28) which enables them to reciprocate inside the hole (30) of the chain (5). The support pin (28) has a return spring (17) fitted in a lateral (previous or next) hole (30) of the chain (5) (FIG. 8*b*). The return spring (17) also prevents the pistachio receptacle (2) from rotating around its axis and keeps it always in a horizontal position during the upward movement of the chain (5) from the lower gear (4) to the upper gear (20) of the head (1), so that the pistachio does not fall off the receptacle (2). The pistachio receptacles (2) are of dimensions corresponding to the dimensions of a pistachio, so that only one pistachio can be held in each hollow cantilever (29) of each receptacle (2).

The feed bin (3) is configured with a funnel-shaped inlet (19), so that the chain (5), passing through the funnel-shaped inlet (19) with the receptacles (2) in the holes (30) of the chain (5) and entering the bin (3), entrains and lifts, moving in the direction of the crusher head (1) (FIGS. 1, 4 and 5), the pistachios contained in the bin (3), one by one, loaded onto and along the hollow cantilevers (scoops) (29) of the receptacles (2). The chain (5) then continues to move, carrying the pistachios in the direction of the crusher head (1).

The crusher head (1) (FIGS. 1, 2, 4, 6 and 10) is provided with adapted length adaptors (7) and a compression spring (14) for each length adaptor (7).

Within the cavity of the head (1) (FIGS. 2 and 4) the adaptor (7) immobilizing bearing (11) is located, which immobilizes the adaptors (7), and two cams (10 and 13) on which the inside of the adaptor immobilizing bearing (11) rests and which rotate between them when the initial adjustment of the machine is made.

The two cams (10 and 13) on which the adaptor (7) immobilizing bearing (11) is mounted are supported on a fixed base (41) and are stationary relative to the head and serve to adjust the eccentricity position of the immobilizing bearing (11) of the adaptor (7), so that as soon as the adaptor (7) reaches, by rotation of the head, the top of the head (1) and directly opposite the depth pressure bearing (9) which is part of the pistachio pressure depth adjustment (27) mechanism, the adaptor (7) is immobilized by the bearing (11) and cannot retract (FIG. 4). Each length adaptor (7) has an adaptor return bearing (12) with a spindle (23) attached to the rear of the adaptor. As shown in FIGS. 4, 6 and 10.

The length adaptors (7) are mounted within through holes (32) in the head (1) into which they can reciprocate. In the embodiment illustrated in FIGS. 10*a* and 10*b*, the head (1) has 9 holes. In a head with a larger diameter, it is possible to have more holes, but always at a distance corresponding to the distance between the receptacles (2) in the holes (30) of the chain (5), so that each pistachio receptacle (2), when it reaches the head (1) with the chain (5), is located directly opposite a through-hole (32) of the head (1), within which an adaptor (7) is always located.

In its intermediate part, located within the hole (32) of the head (1), the length adaptor (7) is provided with serrations (24) (FIG. 6). The immobilizing bearing (11) of the adaptor (7) is circumferentially provided with serrations (25) of the same shape as the serrations (24) of the length adaptors (7) (FIGS. 4 and 6).

The inside of the head (1) is shaped so that the serrations (24) of the adaptors (7) are not covered and so that the serrations (24) of the adaptors (7) can engage with the serrations (25) of the immobilizing bearing (11) at the upper part of the head (1).

The gear (20), which is mounted on the head (1) and rotated by the shaft (22) by an electric motor with reducer (26) (FIG. 2), moves the chain in the direction from the lower gear (4) to the upper gear (20) in a vertical chain position and with the pistachio receptacles (2) moving in the direction from the bottom of the container upwards (FIGS. 2, 4, and 10*a*-10*b*). Around the periphery of the head (1) there is a fixed plate (8) on which a cam (6) is mounted (FIGS. 1 and 2).

As soon as the receptacle (2) which raises the pistachio reaches the gear (20) and before it gets an inclination following the perimeter of the gear (20), the cam (6) releases the adaptor (7), the bearing (12) of which rolls on the cam (6) (Drawing 1), so that by the pressure of a spring (14) located behind the adaptor (7), the adaptor (7) is released and moves towards the pistachio, thus pressing it, holding it against the receptacle (2) so that the pistachio does not fall during the rotation of the chain (5) (FIG. 2).

When the pistachio receptacle (2) reaches the top of the periphery of the gear (20) of the head (1) (FIG. 4), it is opposite an adaptor (7) fitted in a perforated through-hole (32) of the head (1). At that point the receptacle (2) is pressed by the pistachio pressure bearing (9) which is part of the pistachio pressure depth adjustment mechanism (27) so that the receptacle (2) slides into the hole of the chain (5), presses the trapped pistachio onto the corresponding adaptor (7), which (7) at that point is immobilized by the adaptor immobilizing bearing (11) to prevent it from retracting. The depth of the pistachio press is adjusted during operation of the machine by the pistachio press adjuster (27) by turning the screw (31) it provides (FIG. 7). Turned clockwise by the operator, the screw (31) pushes the wedge (34) which in turn pushes the base (35) of the pressure bearing (9), which base (35) is held in contact with the wedge (34) by means of the spring (33), with the result that the pressure bearing (9) is pushed further out of the pressure depth adjustment mechanism (27), whereby the depth of pressure on the pistachio is increased and the result is that the pistachio breaks or opens from the side.

In this position, the immobilizing bearing (11) of the adaptor (7) located inside the head (1), presses the adaptor (7) by engaging the serrations (25) of the immobilizing bearing (11) with the serrations (24) of the adaptor (7) and locks the adaptor (7) in position by the serrations (24) and (25) bearing respectively on both the adaptor (7) immobilizing bearing (11) and the adaptor (7) (Drawings 4 and 6), so that the adaptor (7) is prevented from retracting by the pressure exerted on the pistachio by the receptacle (2) pressed by the pressure bearing (9).

Immediately after being pressed by the pressure bearing (9), the receptacle (2) is returned to its original position on the chain (5) by means of the spring (17) and, during the continued rotation of the head (1), the adaptor return bearing (12) located at the rear of the adaptor (7), (FIG. 1), encounters the cam (6) which causes the adaptor (7) to retract and release the opened pistachio which, due to centrifugal force, is ejected into an output container or onto a conveyor belt depending on the factory facilities.

If the desired result is the opening of the shells of the pistachios, the pistachios are moistened from a few minutes to a few hours before they enter the machine. This is done by first soaking the pistachios in water and then injecting hot air into the pistachios to remove most of the moisture. On the other hand, moistening is omitted if the desired result is the cracking and hulling of the pistachios.

By adapting the constructional dimensions of the hollow cantilever (scoop) (29) of the receptacle (2) and adjusting the pressure adjustment mechanism (27) accordingly, the machine can be used in a similar way for shelling hazelnuts, almonds, pine nuts and other nuts.

The machine is used in the nut hulling industry and in the nut processing industry.

All references, including publications, patent applications, and patents, cited herein are hereby incorporated by reference to the same extent as if each reference were individually and specifically indicated to be incorporated by reference and were set forth in its entirety herein.

The use of the terms “a” and “an” and “the” and “at least one” and similar referents in the context of describing the invention (especially in the context of the following claims) are to be construed to cover both the singular and the plural, unless otherwise indicated herein or clearly contradicted by context. The use of the term “at least one” followed by a list of one or more items (for example, “at least one of A and B”) is to be construed to mean one item selected from the listed items (A or B) or any combination of two or more of the listed items (A and B), unless otherwise indicated herein or clearly contradicted by context. The terms “comprising,” “having,” “including,” and “containing” are to be construed as open-ended terms (i.e., meaning “including, but not limited to,”) unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., “such as”) provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A machine for cracking and opening pistachio shells per unit, comprising:

a chain with a perforated pin for feeding pistachios;

a plurality of pistachio receptacles mounted on the chain, each of the plurality of pistachio receptacles having an elongated hollow cantilever, a support pin, and a return spring;

a lower tensioner gear and an upper head gear guiding the chain;

a bin having a funnel-shaped inlet, the bin adapted to contain loose pistachios;

a round crusher head that includes:

one or more length adaptors with return springs; and an immobilizing bearing around a rotation axis of the head;

wherein the immobilizing bearing carries inside it two cams mounted concentrically on the rotation axis of the head and configured to adjust the immobilization of the length adaptors in a position directly opposite a thrust bearing at an upper point of the crusher head;

a third cam mounted on a plate around a periphery of the crusher head; and a pistachio pressure depth adjustment mechanism disposed at a top of a periphery of the upper head gear, which includes a thrust bearing adjustable by utilizing a screw, a pressure bearing base, and a wedge, wherein the crusher head is configured to apply pressure to both ends of a pistachio simultaneously with an adjustable depth of pressure.

2. The machine of claim 1, wherein the plurality of pistachio receptacles has a size of a pistachio and receives the pistachios one by one.

3. The machine of claim 1, wherein each length adaptor is provided with a return bearing with a spindle and serrations mounted on a rear of the length adaptor in its intermediate part located in a hole within the crusher head, and wherein the immobilizing bearing is provided with peripheral serrations corresponding to the serrations of the length adaptor.

4. The machine of claim 1, wherein the upper head gear mounted on the crusher head is rotated by an electric motor with a reducer and moves the chain in a direction from the lower tensioning gear to the upper head gear in a vertical chain position and with the plurality of pistachio receptacles moving from the bottom of the bin upwards.

5. The machine of claim 1, wherein the plurality of pistachio receptacles are mounted with a respective support pin inside the chain with a perforated pin and in that the return spring of the support pin is fitted in a previous or subsequent hole of the chain.

6. The machine of claim 1, wherein a portion of the chain passing through the bin moves upwards in the direction from the lower gear to the upper gear and is always in a vertical position.

7. The machine of claim 1, wherein the head is provided with holes spaced apart at a distance corresponding to the spacing between the receptacles in the holes of the chain so that each pistachio receptacle when it arrives with the chain at the crusher head is located directly opposite a through-hole of the head within which there is always an adaptor.

8. The machine of claim 1, wherein the length adaptors are provided with serrations and the immobilizing bearing is provided with peripheral serrations of the same shape as the serrations of the length adaptors.

* * * * *